US011852191B2

(12) United States Patent
Choi

(10) Patent No.: US 11,852,191 B2
(45) Date of Patent: Dec. 26, 2023

(54) AIR FOIL THRUST BEARING

(71) Applicant: Neuros Co., Ltd, Daejeon (KR)

(72) Inventor: Ho-Jin Choi, Daejeon (KR)

(73) Assignee: Neuros Co., Ltd., Daejeon (KR)

( * ) Notice: Subject to any disclaimer, the term of this patent is extended or adjusted under 35 U.S.C. 154(b) by 29 days.

(21) Appl. No.: 17/566,800

(22) Filed: Dec. 31, 2021

(65) Prior Publication Data

US 2022/0316524 A1    Oct. 6, 2022

(30) Foreign Application Priority Data

Mar. 31, 2021   (KR) .................. 10-2021-0041644

(51) Int. Cl.
*F16C 17/04*      (2006.01)
(52) U.S. Cl.
CPC ........ *F16C 17/042* (2013.01); *F16C 2300/22* (2013.01)
(58) Field of Classification Search
CPC ................................................ F16C 17/042
See application file for complete search history.

(56) References Cited

U.S. PATENT DOCUMENTS

| | | | |
|---|---|---|---|
| 9,726,220 B2 * | 8/2017 | Kim | F16C 17/042 |
| 11,319,987 B2 * | 5/2022 | Omori | F16C 17/024 |

FOREIGN PATENT DOCUMENTS

| | | |
|---|---|---|
| KR | 101558489 B1 | 10/2015 |
| KR | 20180064052 A | 6/2018 |
| KR | 20200114637 A | 10/2020 |
| WO | WO 2016/153201 A1 | 9/2016 |

OTHER PUBLICATIONS

European Search Report from EP Application No. 21215284.7 dated Jun. 13, 2022.
Office Action issued in KR Application No. 10-2021-0041644.

* cited by examiner

*Primary Examiner* — James Pilkington
(74) *Attorney, Agent, or Firm* — Blank Rome LLP

(57) ABSTRACT

Provided is an air foil thrust bearing including a bump foil plate in which a plurality of bump foils are formed and an arrest ring protrudes in a thickness direction; and a top foil plate in which a plurality of top foils are formed, a through-hole penetrating through both sides of a second plate is formed in a position corresponding to the arrest ring, the top foil plate being stacked on the bump foil plate, wherein the arrest ring is inserted into and penetrates through the through-hole, the arrest ring is bent toward the top foil plate so that the second plate is caught in the arrest ring, and a time for a thrust runner to rise from the top foil at an early stage of starting a rotor as the arrest ring is spaced apart from the second plate.

11 Claims, 15 Drawing Sheets

*<Prior Art>*

*<Prior Art>*

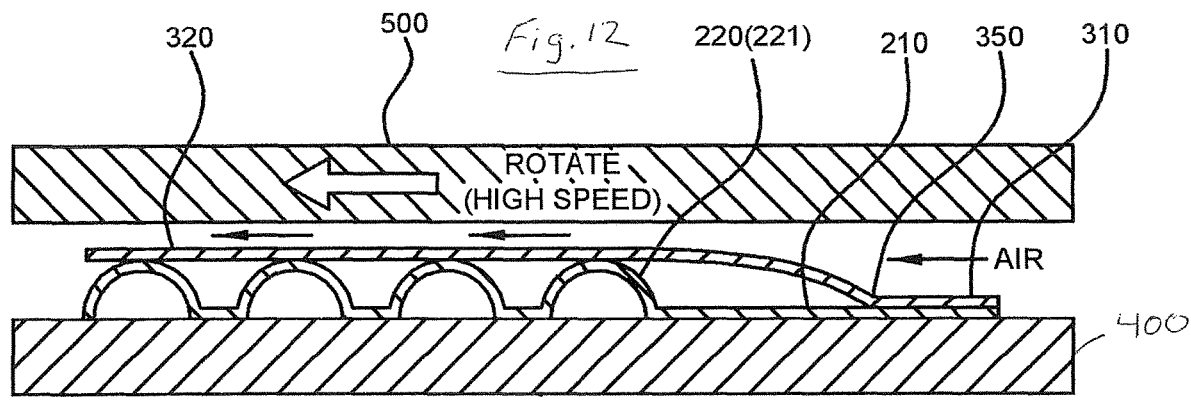
Fig. 12
FIG. 13
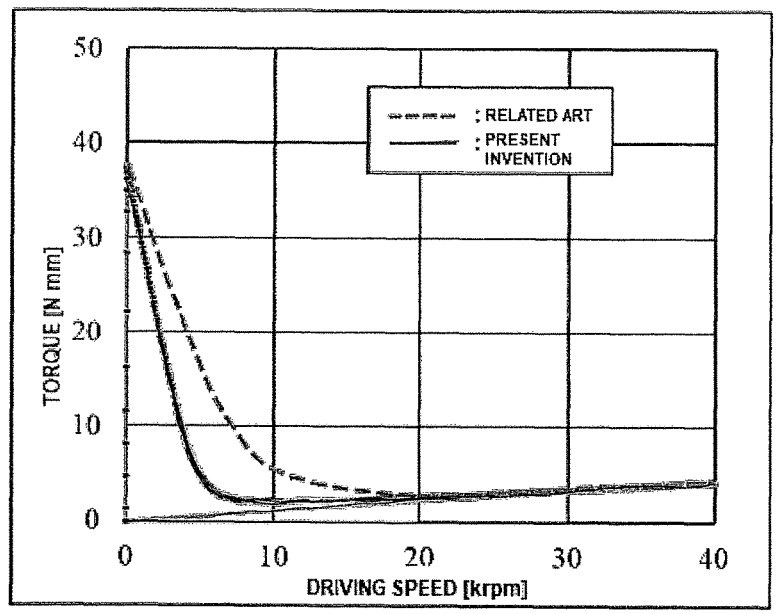

AIR FOIL THRUST BEARING

CROSS-REFERENCE TO RELATED APPLICATIONS

This application claims priority under 35 U.S.C. § 119 to Korean Patent Application No. 10-2021-0041644, filed on Mar. 31, 2021, in the Korean Intellectual Property Office, the disclosure of which is incorporated herein by reference in its entirety.

TECHNICAL FIELD

The following disclosure relates to an air foil thrust bearing supporting an axial load acting on a rotating shaft in a turbo blower or a turbo compressor that supplies air compressed by rotating an impeller at high speeds using a rotational force of a motor.

BACKGROUND

Thrust bearings are used in turbo blowers and turbo compressors to support axial loads, and in order to support axial loads of rotating shafts rotating at high speeds, air foil thrust bearings, among thrust bearings, have largely been used.

Among the air foil thrust bearings, an air foil thrust bearing having an integral structure by integrally forming a plurality of bump foils connected as one body, integrally forming a plurality of top foils connected as one body, and coupling both in a stacking manner so as to be easily assembled has been developed.

As an example, referring to FIG. 1, an air foil thrust bearing having an integral structure of a related art includes a disk-shaped base plate 31 with a hole in the center, a bump foil structure 40 formed as a single structure by connecting two or more bump foils 41 by a first ring 61, and a top foil structure 51 formed as a single structure by connecting two or more top foils 51 by a second ring 62, in which the bump foil structure 40 and the top foil structure 51 are sequentially stacked on a base plate 31. Also, referring to FIG. 2, a first positioning protrusion 73 is formed in the base plate 31, a first positioning hole 63 is formed in the first ring 61 of the bump foil structure 40 so as to be insertion-coupled, and a second positioning hole 64 is formed in the second ring 62 of the top foil structure 51 so as to be insertion-coupled in a similar form, thus allowing a stable assembly in an accurate position. In addition, after assembling, a first connection portion 44 of the bump foil structure 40 and a second connection portion 54 of the top foil structure 51 are welded and fixed to the base plate 31.

However, such a related art air foil thrust bearing is easy to assemble, but since the bump foil structure and the top foil structure are welded and fixed to the base plate, it is difficult to vary an inclination angle in an inclination section of the top foil and there is a limitation for a thrust runner to rise rapidly from the top foil at an early stage of starting of a rotor.

Accordingly, in the related art, the durability of the air foil thrust bearing is deteriorated due to friction and wear between the rotating thrust runner and the top foil.

RELATED ART DOCUMENT

Patent Document

KR 10-2018-0064052 A (Jun. 14, 2018)

SUMMARY

An exemplary embodiment of the present invention is directed to providing an air foil thrust bearing in which a bump foil plate and a top foil plate are easily assembled and coupled, thus preventing erroneous assembly.

Another exemplary embodiment of the present invention is directed to providing an air foil thrust bearing in which a thrust runner rapidly rises from a top foil at an early stage of starting of a rotor, thereby reducing friction and wear of the top foil.

In one general aspect, an air foil thrust bearing includes: a bump foil plate in which a plurality of bump foils are integrally formed with a first plate so that one ends of the bump foils in a circumferential direction are connected to the first plate, the plurality of bump foils including an elastic bump having a concavo-convex shape are arranged to be spaced apart from each other in the circumferential direction, and an arrest ring (also referred to herein as a catching protrusion) protrudes from the first plate in a thickness direction; and a top foil plate in which a plurality of top foils are integrally formed with a second plate so that one ends of the top foils are connected to the second plate in the circumferential direction, the plurality of top foils are arranged to be spaced apart from each other in the circumferential direction, and the second plate includes a through-hole penetrating through both surfaces in a thickness direction in a position corresponding to the arrest ring, wherein the bump foil plate and the top foil plate are stacked, the arrest ring is inserted into and penetrate through a through-hole, the arrest ring is bent toward the top foil plate so that the second plate is caught by the arrest ring, and the arrest ring is spaced apart from the second plate.

The arrest ring may be spaced apart from an inner circumferential surface of the through-hole, and the arrest ring may be spaced apart from the opposite side in which the second plate faces the first plate.

The arrest ring may be formed by bending a remaining portion after a hole is punched in the first plate, and the through-hole may have a hole shape in which the entire circumference is blocked.

The arrest ring may be provided in plurality, and the plurality of arrest rings may be arranged to be spaced apart from each other in a circumferential direction on the first plate, and through-holes may be respectively formed in positions corresponding to the plurality of arrest rings in the second plate.

The plurality of arrest rings may protrude from the first plate in a position corresponding to one through-hole, and the plurality of arrest rings corresponding to the one through-hole may be spaced apart from each other in a circumferential direction of the through-hole.

The arrest ring may be curved in a curved cross-sectional shape upward toward radially an inner side of the through-hole in a direction from a fixed end toward a free end and then bent in a curved cross-sectional shape toward radially an outer side upward.

The arrest ring may be curved in a curved cross-sectional shape upward toward radially an inner side of the through-hole in a direction from a fixed end toward a free end and then bent in a straight cross-sectional shape toward radially an outer side upward.

The top foils may each be formed to be convex in a curved cross-sectional shape toward the opposite side of elastic bumps in a position corresponded by the elastic bumps in a direction from a second connection portion connected to the second plate toward a free end.

The arrest ring may be formed to be bent by cutting a portion inward radially from an outer circumference of the first plate, and the through-hole may be formed in a concave recess inward radially from an outer circumference of the second plate.

The arrest ring may be provided in plurality, the plurality of arrest rings may be arranged to be spaced apart from each other in a circumferential direction on the first plate, and through-holes may be formed in positions corresponding to the plurality of arrest rings in the second plate, respectively.

The arrest ring may be curved in a curved cross-sectional shape upward toward radially an outer side of the first plate in a direction from a fixed end toward a free end and then bent in a straight cross-sectional shape toward radially an inner side of the first plate upward.

Other features and aspects will be apparent from the following detailed description, the drawings, and the claims.

BRIEF DESCRIPTION OF THE DRAWINGS

FIG. 12 is a cross-sectional view illustrating a state in which a top foil is pressed to be deformed by pressure of air flowing during high-speed rotation of the thrust runner in FIG. 11.

FIGS. 13 to 15 are graphs illustrating comparison of test results of the air foil thrust bearing of the related art and the air foil thrust bearing according to the first exemplary embodiment of the present invention mounted on a turbo blower.

DETAILED DESCRIPTION OF EXEMPLARY EMBODIMENTS

Hereinafter, an air foil thrust bearing of the present invention as described above will be described in detail with reference to the accompanying drawings.

First Exemplary Embodiment

Figure 1:
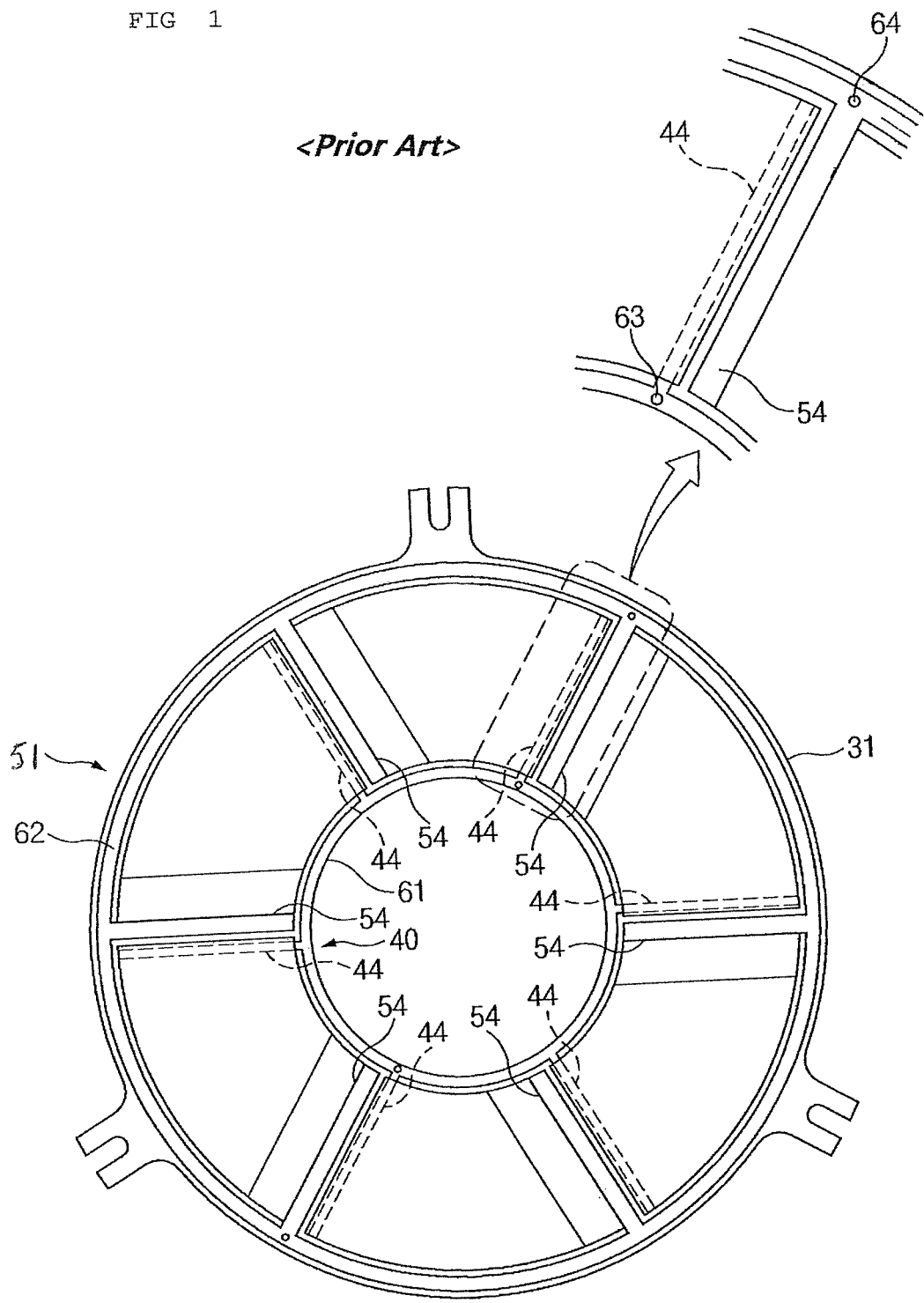
FIGS. 1 and 2 are perspective and cross-sectional views illustrating an air foil thrust bearing of the related art.
Figure 2:
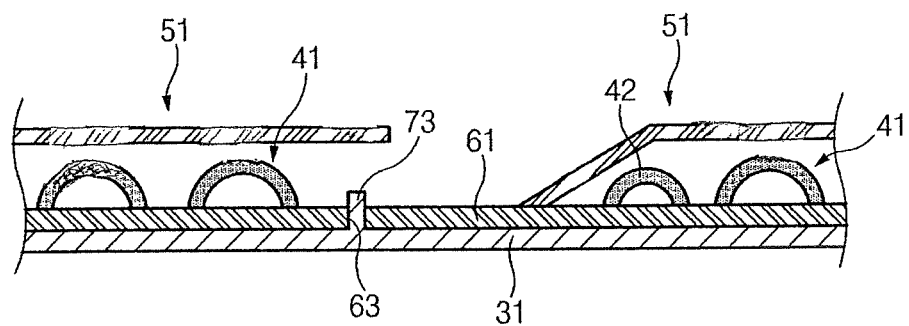
Figure 3:
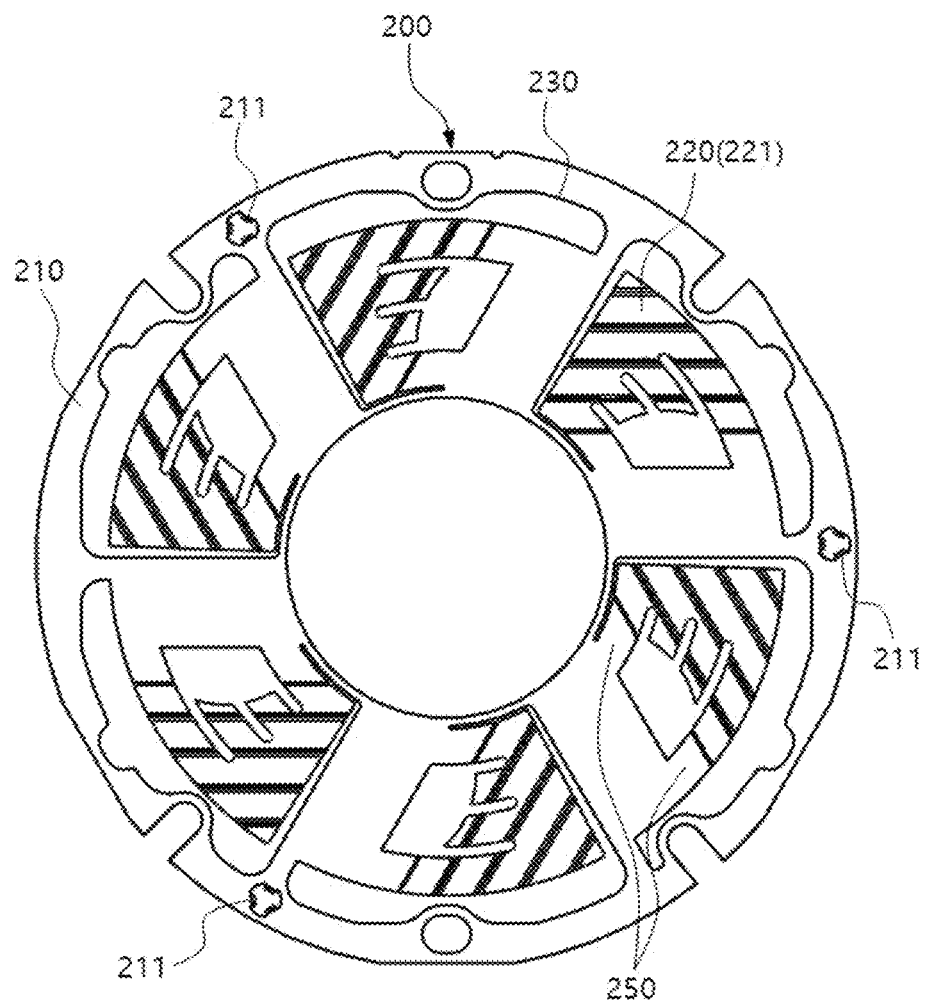
FIGS. 3 and 4 are front views illustrating a bump foil plate and a top foil plate of the air foil thrust bearing according to a first exemplary embodiment of the present invention.
Figure 4:
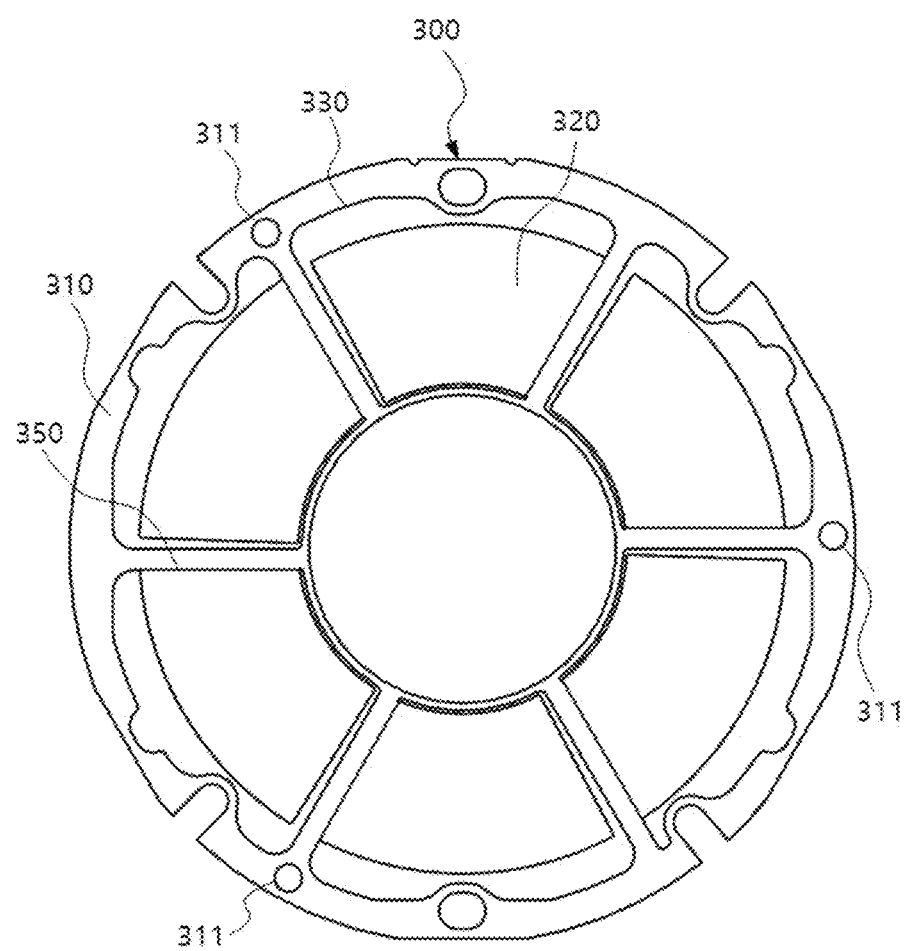
Figure 5:
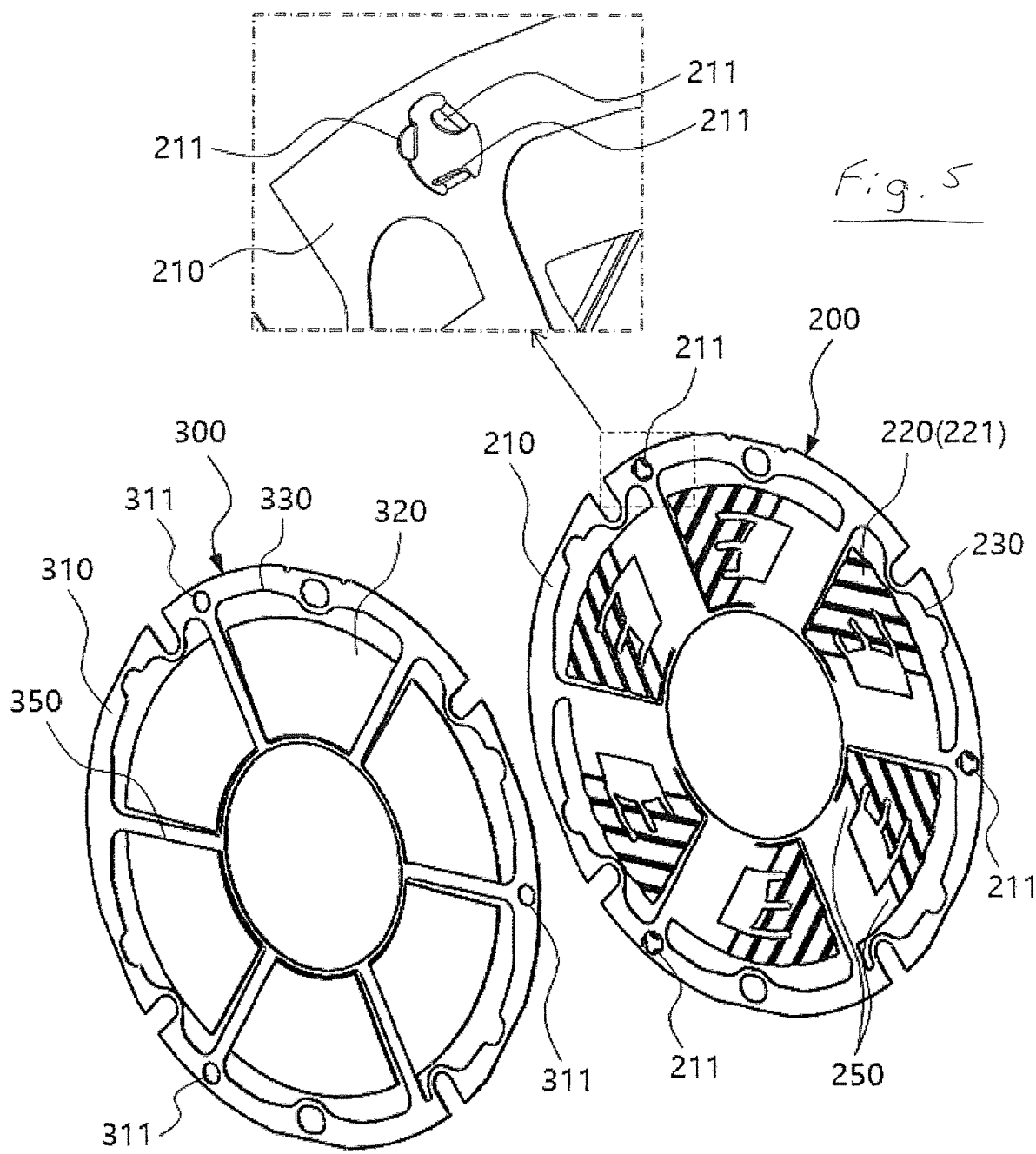
FIGS. 5 and 6 are an exploded perspective view and an assembled perspective view of the air foil thrust bearing according to the first exemplary embodiment of the present invention.
Figure 6:
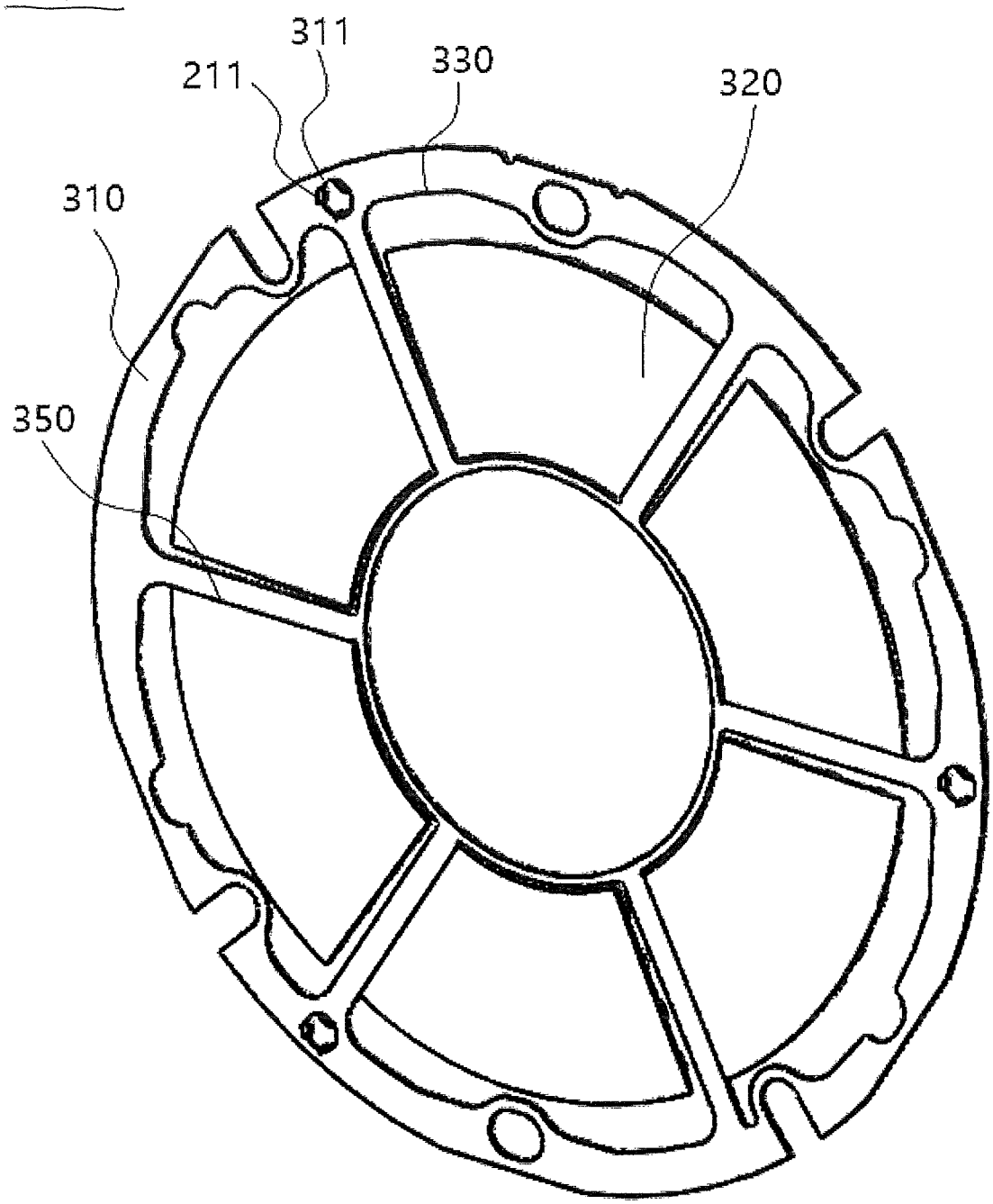
Figure 7:
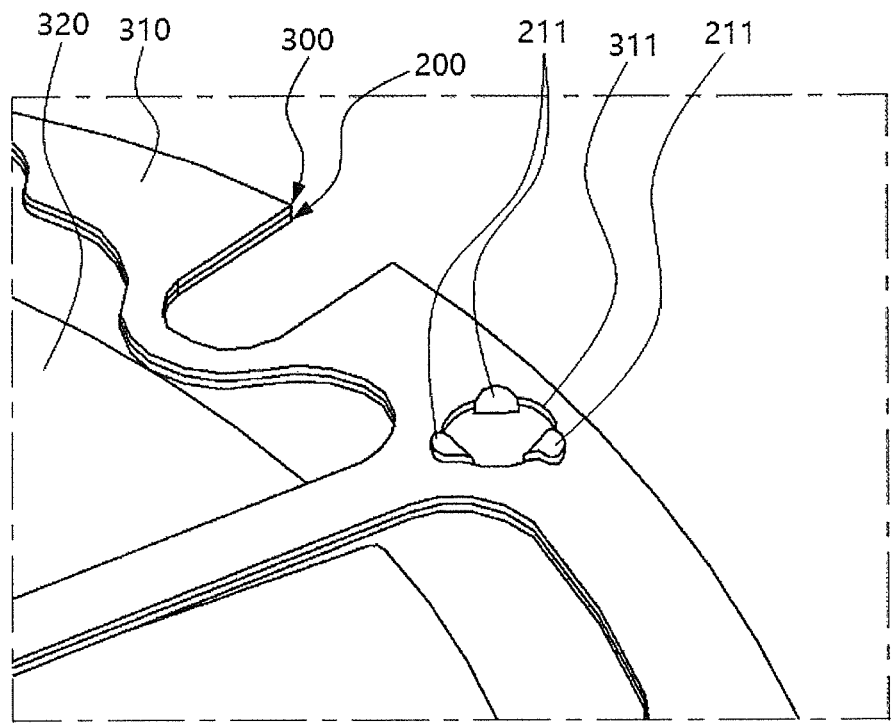
FIG. 7 is a partially enlarged view of the air foil thrust bearing according to the first exemplary embodiment of the present invention.
Figure 8A:
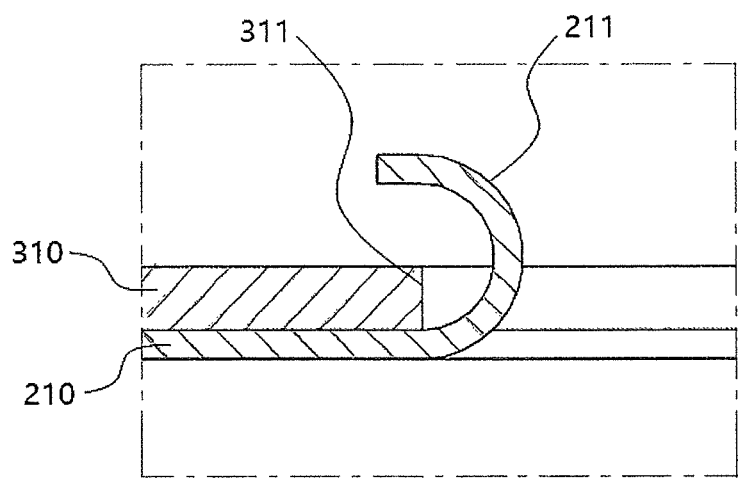
FIGS. 8A and 8B are partial cross-sectional views illustrating various examples of the air foil thrust bearing according to the first exemplary embodiment of the present invention.
Figure 8B:
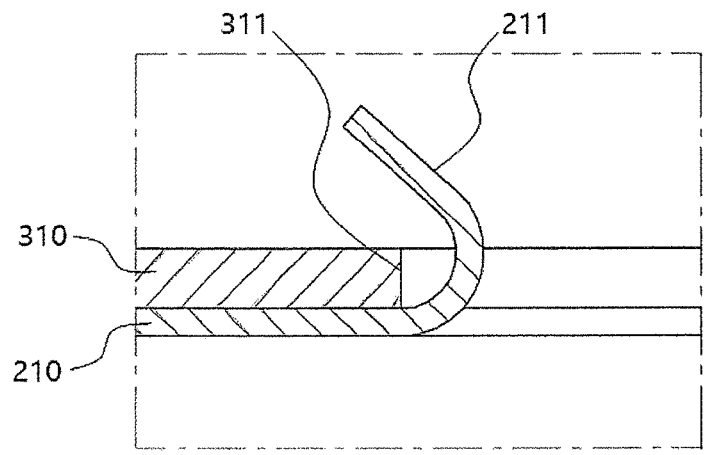

FIGS. 3 and 4 are front views illustrating a bump foil plate and a top foil plate of the air foil thrust bearing according to a first exemplary embodiment of the present invention, FIGS. 5 and 6 are an exploded perspective view and an assembled perspective view of the air foil thrust bearing according to the first exemplary embodiment of the present invention, FIG. 7 is a partially enlarged view of the air foil thrust bearing according to the first exemplary embodiment of the present invention, and FIGS. 8A and 8B are partial cross-sectional views illustrating various examples of the air foil thrust bearing according to the first exemplary embodiment of the present invention.

As shown, the air foil thrust bearing according to the first exemplary embodiment of the present invention may largely include a bump foil plate 200 and a top foil plate 300.

The bump foil plate 200 may include a first plate 210 and a plurality of bump foils 220, and the first plate 210 and each of the bump foils 220 may be integrally connected to each other. The bump foils 220 may be arranged to be spaced apart from each other in a circumferential direction, and one end in the circumferential direction may be connected to the first plate 210, and remaining portions except for the connected end may be spaced apart from the first plate 210. That is, only a clockwise end of the bump foil 220 may be connected to the first plate 210 to form a first connection portion 250, and inner, outer, and counterclockwise ends of the bump foil 220 may not be connected to the first plate 210 and may be separated therefrom. In addition, the bump foil 220 may have various forms such as a corrugated form or a wavy form by forming concavo-convex elastic bumps 221, and the bump foil 220 may be formed such that the elastic bumps 221 protrude forward from a front surface of the first plate 210. Here, an arrest ring 211 may be formed on the first plate 210 in a form that protrudes forward from the front surface in a thickness direction. Also, the arrest ring 211 may be formed in a position slightly spaced apart inward radially from an outer circumference of the first plate 210, and the arrest ring 211 may be located radially outward than the bump foil 220. In addition, the arrest ring 211 may be formed by bending a portion, which remains after punching a hole in the first plate 210, toward the front in the thickness direction. In addition, the arrest ring 211 may be provided in plurality, and the plurality of arrest rings 211 may be arranged to be spaced apart from each other in a circumferential direction on the first plate 210. As an example, the arrest rings 211 may be arranged to be spaced apart from each other at intervals of 120 degrees. In addition, a plurality of arrest rings 211 may be formed at respective points at intervals of 120 degrees, and the arrest rings 211 formed at the respective points may be arranged to be spaced apart from each other in a circumferential direction with respect to the center of each point.

The top foil plate 300 may include a second plate 310 and a plurality of top foils 320, and the second plate 310 and each of the top foils 320 may be integrally connected to each other. The top foils 320 may be arranged to be spaced apart from each other in a circumferential direction, and a clockwise end may be connected to the second plate 310, and the remaining portions except for the connected clockwise end may be spaced apart from the second plate 310. That is, only the clockwise end of the top foil 320 may be connected to the second plate 310 to form a second connection portion 350, and inner, outer, and counterclockwise ends of the top foil 320 in the circumferential direction may not be connected to the second plate 210 and may be separate therefrom. In addition, a bent portion may extend to be formed convexly to the front from the second connection portion 350 of the top foil 320 connected to the second plate 310 in a counterclockwise direction. Here, the top foil 320 may be formed in a convexly curved cross-section from the second connection portion 350 to a free end to the opposite side of the elastic bumps 221. In addition, the second plate 310 may have through-holes 311 penetrating both sides in a thickness direction at positions corresponding to the arrest rings 211 of the bump foil plate 200. Here, the through-hole 311 is a portion through which the arrest ring 211 is inserted, and the through-hole 311 may be formed in the form of a circular hole in which the entire circumference is blocked.

Also, the side on which the elastic bumps 221 of the bump foil 220 protrude from the bump foil plate 200 and the opposite side on which a bent portion of the top foil 320 protrudes from the top foil plate 300 may be stacked and assembled to face each other. At this time, as illustrated in FIG. 6, the arrest ring 211 of the bump foil plate 200 is inserted into and penetrates through the through-hole 311 of the top foil plate 300, and a portion of the arrest ring 211 may be assembled to protrude forward than the second plate 310 of the top foil plate 300. Thereafter, as illustrated in FIG. 7, the arrest ring 211 may be bent toward the second plate 310 so that the second plate 310 is caught in and coupled with the arrest ring 211 so as not to escape in the stacked opposite direction. Therefore, assembly and coupling of the bump foil plate 200 and the top foil plate 300 may be facilitated, and erroneous assembly may be prevented.

Referring to FIGS. 8A and 8B, the arrest ring 211 may be spaced apart from an inner circumferential surface of the through-hole 311, and the arrest ring 211 may be bent or curved in a form spaced apart from the opposite side in which the second plate 310 faces the first plate 210. This means that the sides of the bump foil plate 200 and the top foil plate 300 facing each other are not in close contact with and fixed to each other, but the bump foil plate 200 and the top foil plate 300 are assembled and coupled with each other and the bump foil plate 200 and the top foil plate 300 may be spaced apart from each other within a specific range. As illustrated in FIG. 8A, the arrest ring 211 may be curved upward in a curved cross-section form toward the radially inward of the through-hole 311 in a direction from a fixed end connected to the first plate 210 to a free end and then bent in the form of a curved cross-section toward a radially outward direction. Or, as illustrated in FIG. 8B, the arrest ring 211 may be curved upward in a curved cross-sectional form toward the radially inward of the through-hole 311 in a direction from the fixed end toward the free end and then bent in the form of a straight cross-section toward the radially outward direction.

Figure 9:
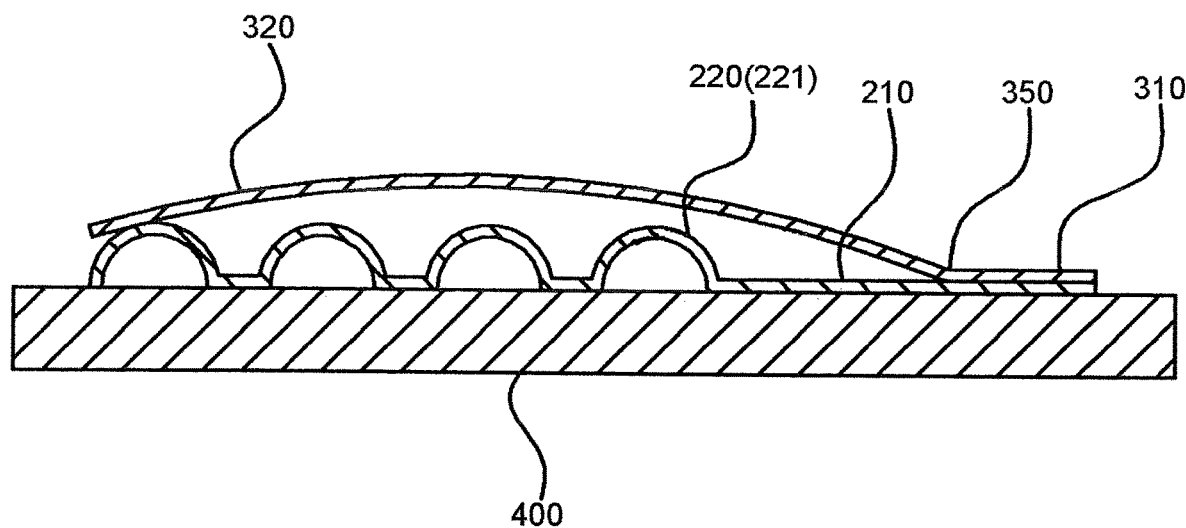
FIG. 9 is a cross-sectional view taken along a circumferential direction illustrating a state in which the air foil thrust bearing according to the first exemplary embodiment of the present invention is not pressed by a thrust runner.

FIG. 9 is a cross-sectional view taken along a circumferential direction illustrating a state in which the air foil thrust bearing according to the first exemplary embodiment of the present invention is not pressed by a thrust runner.

Referring to FIG. 9, when the air foil thrust bearing of the present invention is mounted on a turbo blower, etc., the air foil thrust bearing is coupled to the bearing housing 400 and in a state in which external force is not applied before the thrust runner is assembled, a portion of the second plate 310 adjacent to the second connection portion 350 of the top foil 320 may be in contact with the first plate 210 of the bump foil plate or may be in a state of being slightly spaced apart therefrom. In addition, a portion adjacent to the free end of the top foil 320 may be in contact with the elastic bump 221 disposed at a corresponding position or may be in a state of being slightly spaced apart therefrom.

Figure 10:
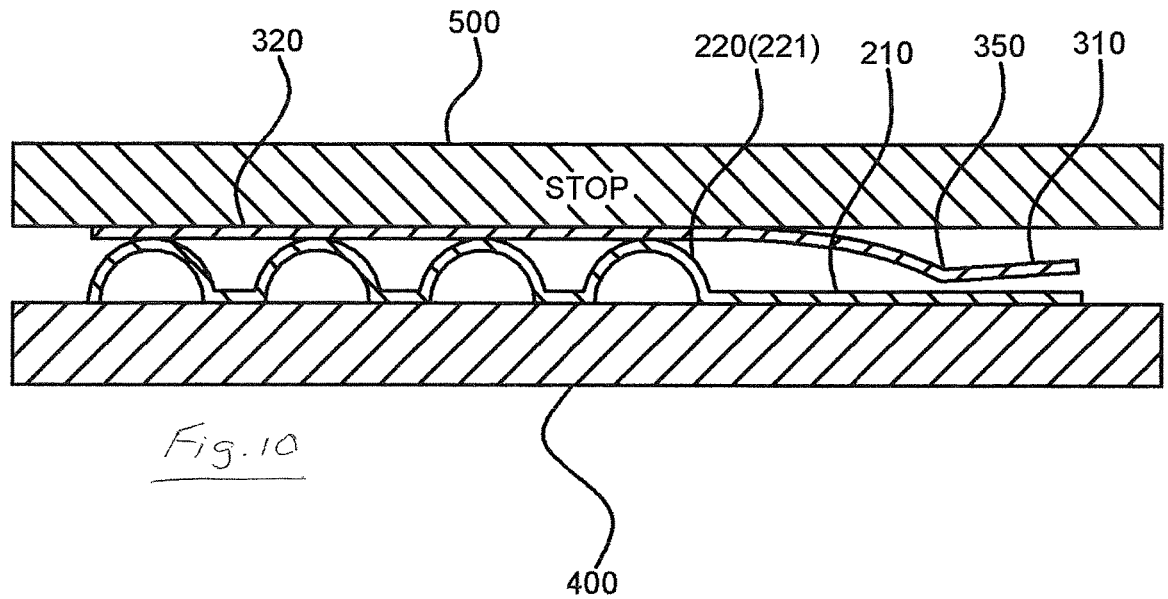
FIG. 10 is a cross-sectional view illustrating a state in which a top foil is pressed to be deformed by the thrust runner stopped in FIG. 9.

FIG. 10 is a cross-sectional view illustrating a state in which a top foil is pressed to be deformed by a stopped thrust runner, when the thrust runner is assembled in the state as illustrated in FIG. 9.

Referring to FIG. 10, in the air foil thrust bearing of the present invention, in a state in which the bump foil 220 is in contact with the bearing housing 400 and the thrust runner 500 is disposed to face the top foil 320, the top foil 320 may be pressed and spread to be flattened by the thrust runner 500. Here, when the top foil 320 is pressed by the thrust runner 500, a region thereof supported by the elastic bumps 221 is spread to be flattened and the second plate 310 adjacent to the second connection portion 350 is moved in a direction away from the first plate 210, and accordingly, an inclination angle of the top foil 320 becomes gentle (is reduced) in an inclination section of the top foil 320 to a first positioned elastic bump 221 from the second connection portion 350 to the free end.

Figure 11:
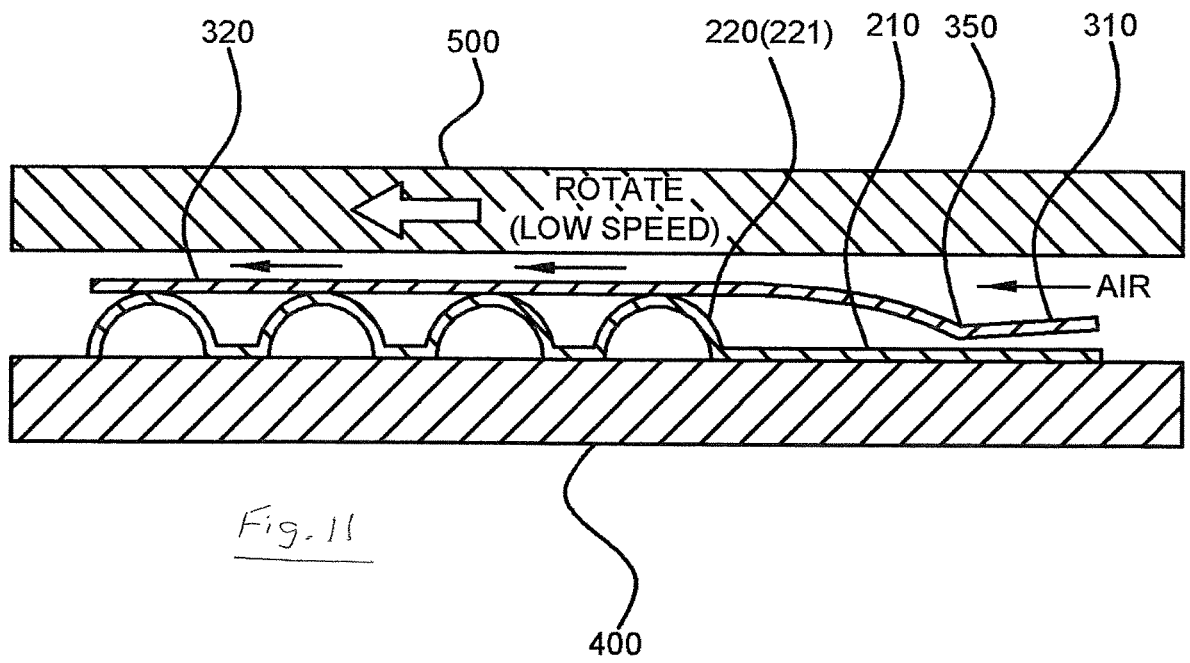
FIG. 11 is a cross-sectional view illustrating a state in which the thrust runner rises from a top foil during low-speed rotation of the thrust runner in FIG. 10.

FIG. 11 is a cross-sectional view illustrating a state in which the thrust runner rises from a top foil during low-speed rotation of the thrust runner in FIG. 10.

Referring to FIG. 11, when the turbo blower is operated and the thrust runner 500 starts to rotate together with a rotor, an axial load acts in a direction of a rotation axis of the rotor and the top foil 320 of the air foil thrust bearing is in contact with the rotated thrust runner 500 to cause friction. Also, the thrust runner 500 rises from the top foil 320 by pressure of air flowing between the thrust runner 500 and the top foil 320 so that the top foil 320 and the thrust runner 500 may be spaced apart from each other. At this time, the top foil 320 corresponding to a region supported by the elastic bumps 221 is spread to be flattened by the pressure of the air flowing between the top foil 320 and the thrust runner 500 and is in contact with the elastic bumps 221, and the second plate 310 adjacent to the second connection portion 350 of the top foil 320 may be maintained in a state as illustrated in FIG. 10. Therefore, when the rotor rotates at a low speed, air may flow easily between the top foil 320 and the thrust runner 500 and the pressure of the air rises quickly, so a time for the thrust runner 500 to rise from the top foil 320 may be shortened. As a result, friction and wear of the top foil may be reduced, which may improve the durability of the air foil thrust bearing.

FIG. 12 is a cross-sectional view illustrating a state in which the top foil is FIG. 12 is a cross-sectional view illustrating a state in which a top foil is pressed to be deformed by pressure of air flowing during high-speed rotation of the thrust runner in FIG. 11.

Referring to FIG. 12, during a rotation at a high speed in which RPM of the rotor is high, the second plate 310 adjacent to the second connection portion 350 of the top foil 320 is pressed by the pressure of air and comes into contact with and supported by the first plate 210, and accordingly, an inclination angle of the top foil 320 is increased to further increase the pressure of the air flowing between the top foil 320 and the thrust runner 500 to improve a load bearing force of the air foil thrust bearing at the high speed.

Figure 14:
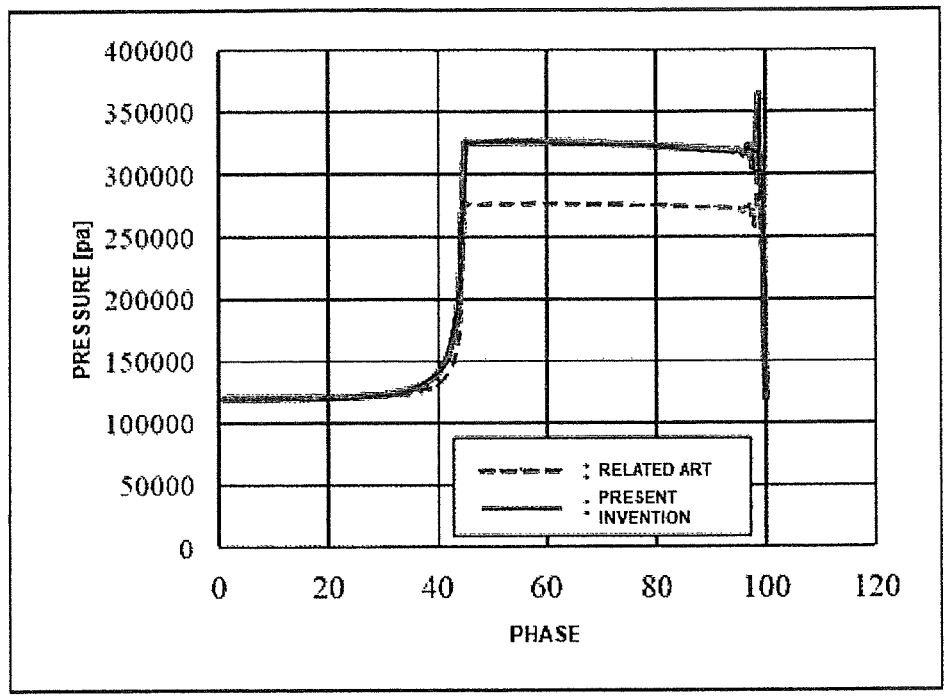
Figure 15:
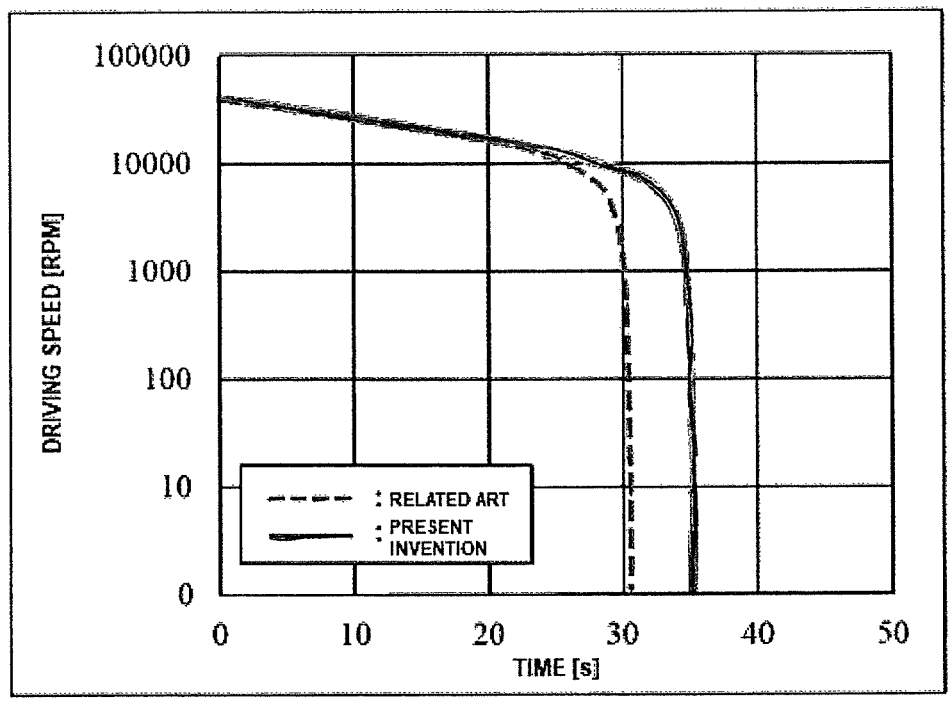

FIGS. 13 to 15 are graphs illustrating comparison of test results of the air foil thrust bearing of the related art and the air foil thrust bearing according to the first exemplary embodiment of the present invention mounted on a turbo blower.

Figure 16:
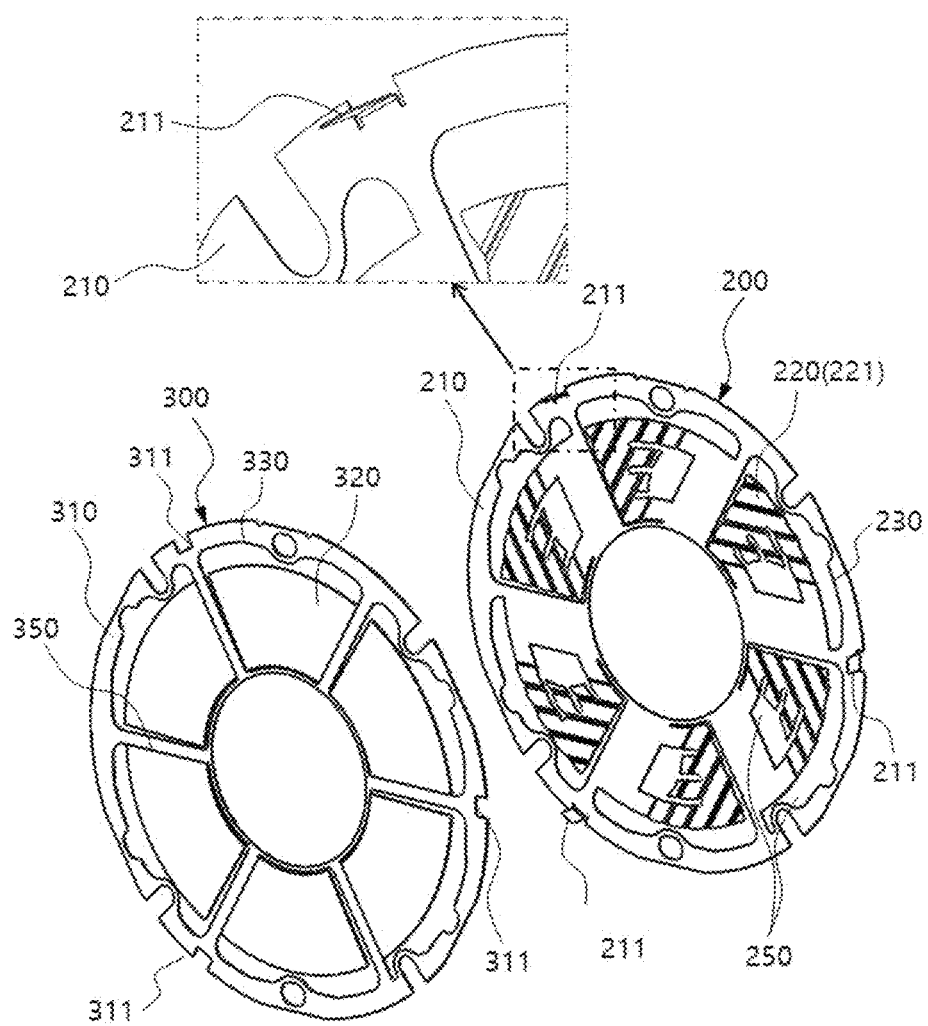
FIGS. 16 and 17 are an exploded perspective view and an assembled perspective view of an air foil thrust bearing according to a second exemplary embodiment of the present invention.
Figure 17:
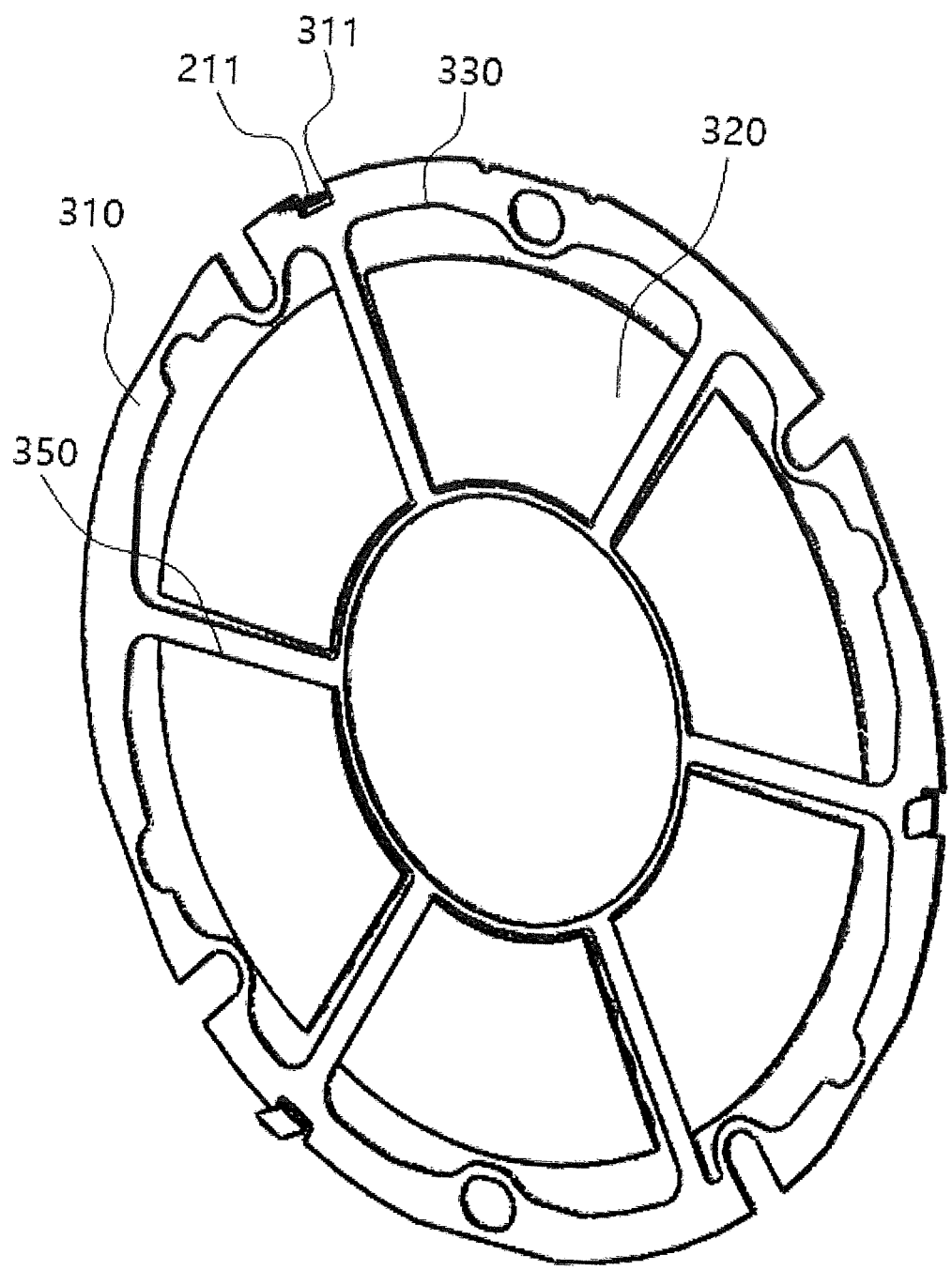
Figure 18:
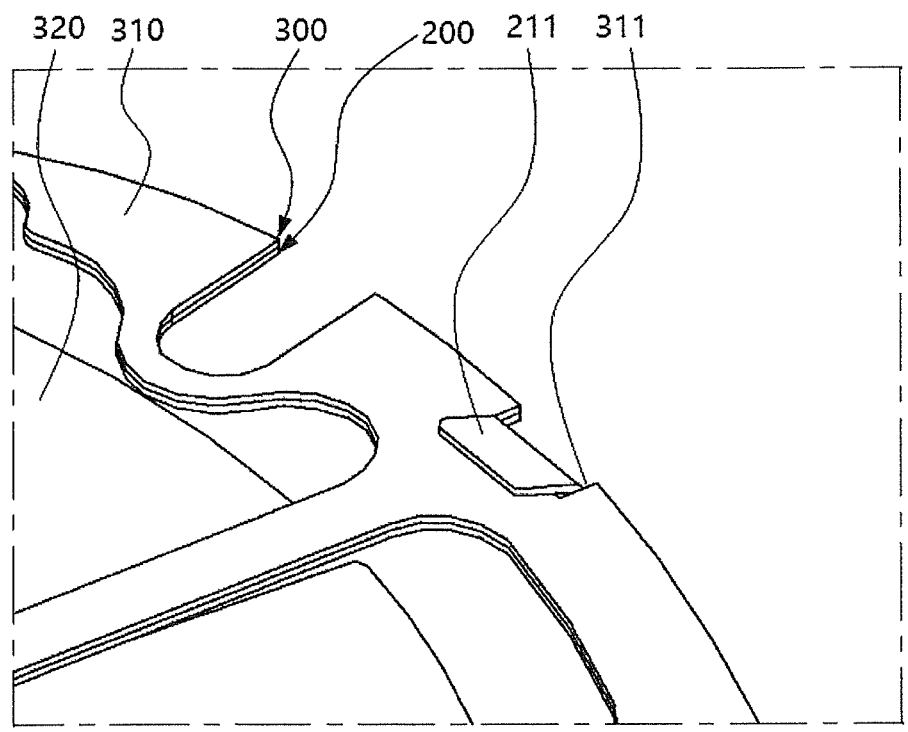
FIG. 18 is a partially enlarged view of the air foil thrust bearing according to the second exemplary embodiment of the present invention.
Figure 19A:
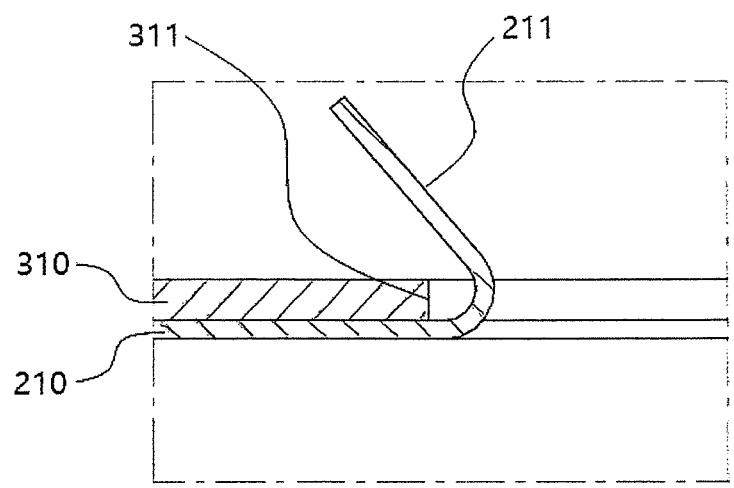
FIGS. 19A and 19B are partial cross-sectional views illustrating various examples of the air foil thrust bearing according to the second exemplary embodiment of the present invention.
Figure 19B:
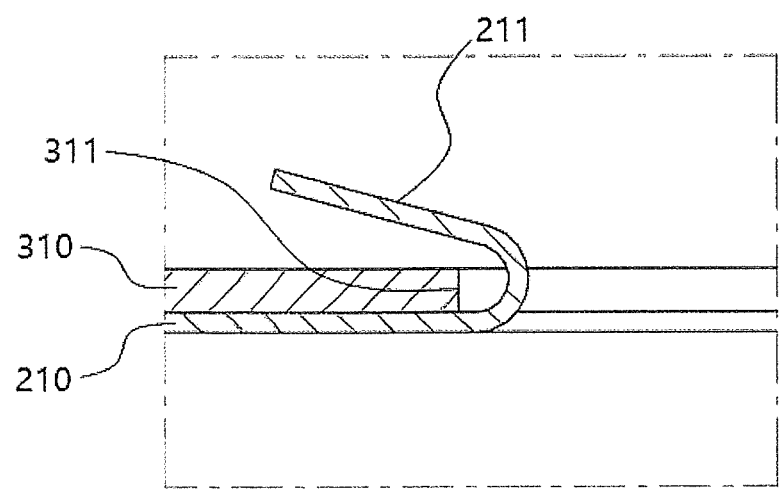

FIG. 13 shows a result of measuring a driving torque according to a driving speed by mounting the air foil thrust bearing on a turbo blower. As shown, when the air foil thrust bearing of the present invention was used, the driving torque was relatively small at a low speed compared to the related art, and through this, it can be seen that the thrust runner rises relatively quickly from the top foil at a low speed when the air foil thrust bearing of the present invention is used, compared with the related art. FIG. 14 shows a result of measuring pressure of air according to a phase of the top foil when the rotor rotates at a low speed. As shown, when the air foil thrust bearing of the present invention was used, the pressure of air was relatively high at a low speed, compared to the related art, and through this, it can be seen that the thrust runner rises relatively quickly from the top foil at a low speed when the air foil thrust bearing of the present invention is used. FIG. 15 shows measurement of a time for which the rotor which rotates by inertia is stopped when a driving force is cut off in a state in which the rotor is rotated. As shown, when the air foil thrust bearing of the present invention was used, the rotation time based on the inertia of the rotor was longer than that of the related art, and through this, it can be seen that the thrust runner rises relatively quickly from the top foil at a low speed when the air foil thrust bearing of the present invention is used Second Exemplary Embodiment FIGS. 16 and 17 are an exploded perspective view and an assembled perspective view of an air foil thrust bearing according to a second exemplary embodiment of the present invention, FIG. 18 is a partially enlarged view of the air foil thrust bearing according to the second exemplary embodiment of the present invention, and FIGS. 19A and 19B are partial cross-sectional views illustrating various examples of the air foil thrust bearing according to the second exemplary embodiment of the present invention.

As shown, the air foil thrust bearing according to the second exemplary embodiment of the present invention may include the bump foil plate 200 and the top foil plate 300, and the second exemplary embodiment is the same as the first exemplary embodiment, except for a specific configuration of the arrest ring 211 and the through-hole 311.

In the second exemplary embodiment, the arrest ring 211 may be formed by cutting and bending a portion radially inward from an outer circumference of the first plate 210, and the through-hole 311 may be formed in a form concave radially inward from an outer circumference of the second plate 310. The arrest ring 211 may be provided in plurality, and the plurality of arrest rings 211 may be arranged to be spaced apart from each other in a circumferential direction on the first plate 210, and through-holes 311 in a recess shape may be formed in positions corresponding to the plurality of arrest rings 211 in the second plate 310. Here, similarly, the arrest ring 211 may be spaced apart from an inner circumferential surface of the through-hole 311 and may also be spaced apart from the opposite side in which the second plate 310 faces the first plate 210. Also, the arrest ring 211 may be curved in a curved cross-sectional shape upward toward radially an outer side of the first plate 210 in a direction from a fixed end toward a free end and then bent in a straight cross-sectional shape toward radially an inner side of the first plate 210 upward.

In addition, the bump foil plate 200 may be integrally formed in a form in which the first plate 210 and the bump foils 220 are connected as one body by cutting one plate. That is, by pressing one plate in the form of a flat plate and cutting the plate such that the first plate 210 is manufactured in a form in which a hole is drilled in the center having a disk shape, and at the same time an outer portion of a plurality of bump foils 220 is formed, so that the bump foils 220 may be integrally manufactured to be connected to the first plate 210. At this time, the bump foil plate 200 is pressed to form the shape of the first plate 210, the contour shape of the bump foils 220, and the shape of the arrest ring 211 before being bent, and then the elastic bump 221 is formed such that a concavo-convex shape of the bump foils 220 appear, and the arrest ring 211 is bent to protrude in a thickness direction. Here, a first slot 230 may be formed between the bump foil 220 and the first plate 210 so that the other remaining portions excluding a portion of each bump foil 220 is connected to the first plate 210 are spaced apart from each other. That is, the first plate 210 is manufactured by pressing one plate in the form of a plate, and when the plate is cut so that the outer portions of the plurality of bump foils 220 are formed, the plate is cut in the form of the first slot 230 and removed, so that the bump foils 220 may be integrally formed in a form in which the remaining portions except for the portion connected to the first plate 210 are spaced apart from each other.

In addition, the top foil plate 300 may also be integrally formed in a form in which one ends of the second plate 310 and the top foil 320 are connected by cutting one plate. That is, the second plate 310 having a hole in the center of a disk shape is manufactured by pressing one plate in the form of a flat plate, and at the same time, the plate may be cut so that outer portions of the plurality of top foils 320 are formed, thereby integrally manufacturing a form in which the top foils 320 are connected to the second plate 310. At this time, after the top foil plate 300 is pressed so that the shape of the second plate 310 and the contour shape of the top foils 320 and the through-holes 311 are formed, the top foil plate 300 may be formed such that a shape of a bent portion of the top foils 320 appears. Here, a second slot 330 may be formed between the top foil 320 and the second plate 310 so that the other remaining portion excluding the portion of each top foil 320 connected to the second plate 310 is spaced apart from each other in the top foil plate 300. That is, the second plate 310 is manufactured by pressing one plate in the form of a plate, and at the same time, when the plate is cut so that the outer portions of the plurality of top foils 320 are formed, the plate is cut in the form of the second slot 330, whereby the remaining portions, excluding the portions of the top foil 320 connected to the second plate 310 may be integrally formed to be spaced apart from each other.

The air foil thrust bearing of the present invention is advantageous in that the bump foil plate and the top foil plate may be easily assembled and coupled, and erroneous assembly may be prevented.

In addition, the top foil is pressed and spread to be flattened in contact with the thrust runner or pressure of air flowing between the top foil and the rotated thrust runner at the time of starting of a rotor, and thus, an inclination angle of an inclination section of the top foil is gentle and pressure of air is quickly increased, whereby a time for the thrust runner to rise from the top foil at the initial state of starting of the rotor may be shortened to reduce friction and wear of the top foil.

The present invention is not limited to the above-mentioned exemplary embodiments but may be variously applied, and may be variously modified by those skilled in the art to which the present invention pertains without departing from the gist of the present invention claimed in the claims.

What is claimed is:

1. An air foil thrust bearing comprising:
   a bump foil plate in which a plurality of bump foils are integrally formed with a first plate so that one end of each bump foil in a circumferential direction is connected to the first plate, the plurality of bump foils each including a plurality of elastic bumps spaced apart from each other in the circumferential direction, and a catching protrusion protrudes from the first plate in a thickness direction; and
   a top foil plate in which a plurality of top foils are integrally formed with a second plate so that one end of each top foil is connected to the second plate in the circumferential direction, the plurality of top foils are arranged to be spaced apart from each other in the circumferential direction, and the second plate includes a through-hole penetrating through the second plate in a thickness direction in a position corresponding to the catching protrusion,
   wherein the bump foil plate and the top foil plate are stacked, the catching protrusion is inserted into and penetrates through the through-hole, the catching protrusion is bent toward the top foil plate so that the second plate is caught by the catching protrusion, and the catching protrusion is spaced apart from the second plate.

2. The air foil thrust bearing of claim 1, wherein the catching protrusion is spaced apart from an inner circumferential surface of the through-hole, and the catching protrusion is spaced apart from a side of the second plate that is opposite to a side of the second plate that faces the first plate.

3. The air foil thrust bearing of claim 2, wherein the catching protrusion is formed by cutting and bending a portion inward from an outer circumference of the first plate, and the through-hole is a concave recess in the second plate.

4. The air foil thrust bearing of claim 3, wherein the first plate includes a plurality of catching protrusions that are arranged spaced apart from each other in a circumferential direction, and the second plate includes a plurality of through-holes that are respectively formed in positions corresponding to the plurality of catching protrusions.

5. The air foil thrust bearing of claim 3, wherein the catching protrusion is curved in a curved cross-sectional shape upward toward a radially outer side of the first plate in a direction from a fixed end toward a free end and then extended in a straight cross-sectional shape toward a radially inner side of the first plate.

6. The air foil thrust bearing of claim 1, wherein the catching protrusion is formed by bending a remaining portion after a hole is punched in the first plate.

7. The air foil thrust bearing of claim 6, wherein the first plate includes a plurality of catching protrusions that are arranged spaced apart from each other in a circumferential direction, and the second plate includes a plurality of through-holes that are respectively formed in positions corresponding to the plurality of catching protrusions.

8. The air foil thrust bearing of claim 7, wherein the plurality of catching protrusions protrude from the first plate in positions corresponding to the respective through-holes.

9. The air foil thrust bearing of claim 6, wherein the catching protrusion is curved in a curved cross-sectional shape upward toward an inner side of the through-hole in a direction from a fixed end toward a free end and then bent in a curved cross- sectional shape toward an outer side of the through-hole.

10. The air foil thrust bearing of claim 6, wherein the catching protrusion is curved in a curved cross-sectional shape upward toward an inner side of the through-hole in a direction from a fixed end toward a free end and then extended in a straight cross-sectional shape toward an outer side of the through-hole.

11. The air foil thrust bearing of claim 1, wherein the top foils have a curved cross sectional shape.

* * * * *